(12) United States Patent
Brannen

(10) Patent No.: US 7,252,274 B1
(45) Date of Patent: Aug. 7, 2007

(54) CLAMPING DEVICE FOR STAINLESS STEEL SINKS

(76) Inventor: Russell H. Brannen, PMB #202, 2500 Dallas Hwy., Suite 202, Marietta, GA (US) 30064

( * ) Notice: Subject to any disclaimer, the term of this patent is extended or adjusted under 35 U.S.C. 154(b) by 90 days.

(21) Appl. No.: 11/179,263

(22) Filed: Jul. 12, 2005

(51) Int. Cl.
*A47H 1/10* (2006.01)

(52) U.S. Cl. .................. 248/301; 248/304; 248/339

(58) Field of Classification Search ............. 248/301, 248/304, 305, 339, 340, 341, 215, 225.21
See application file for complete search history.

(56) References Cited

U.S. PATENT DOCUMENTS

| | | | | |
|---|---|---|---|---|
| 4,025,016 A | * | 5/1977 | Brothers | 248/210 |
| 4,222,541 A | * | 9/1980 | Cillis | 248/210 |
| 4,760,986 A | * | 8/1988 | Harrison | 248/231.61 |
| 5,560,576 A | * | 10/1996 | Cargill | 248/231.61 |
| 6,808,147 B2 | | 10/2004 | Brannen et al. | |

* cited by examiner

*Primary Examiner*—Ramon O Ramirez
(74) *Attorney, Agent, or Firm*—Marvin L. Moore

(57) ABSTRACT

A clamping device for stainless steel sinks having rolled rim edges used for suspension of weighted items from a sink's rolled rim edge for better organization around the sink work area comprising, a hanger bracket, a compression gib, and a fastening means. The hanger bracket is further defined by a front having an elongated vertical slot, a supporting member, and a crispate top. The compression gib includes a generally horizontally disposed bracing arm having an integral arm which extends upwardly and vertically in relation to the bracing arm. The integral arm further has an elongated vertical slot which extends the length along a longitudinal axis. Attached to the upper most portion of the integral arm is a crispate top which is substantially identical in configuration and shape, to the arcuate portion of the underside of the rolled rim sink to which it is attached. The fastening means is received by the slots of the hanger bracket and gib and detachably holds the device together. The various components of the present invention, and the manner in which they interrelate will be described in greater detail hereinafter.

15 Claims, 3 Drawing Sheets

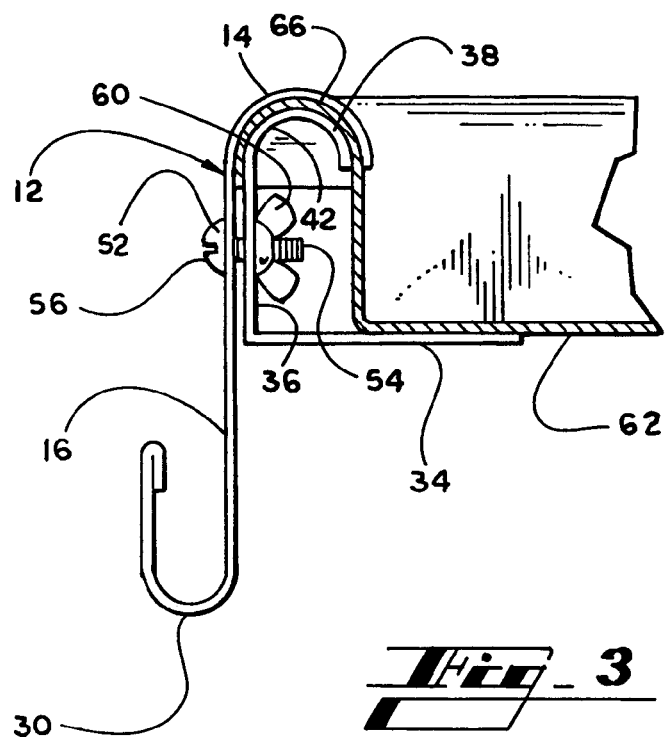
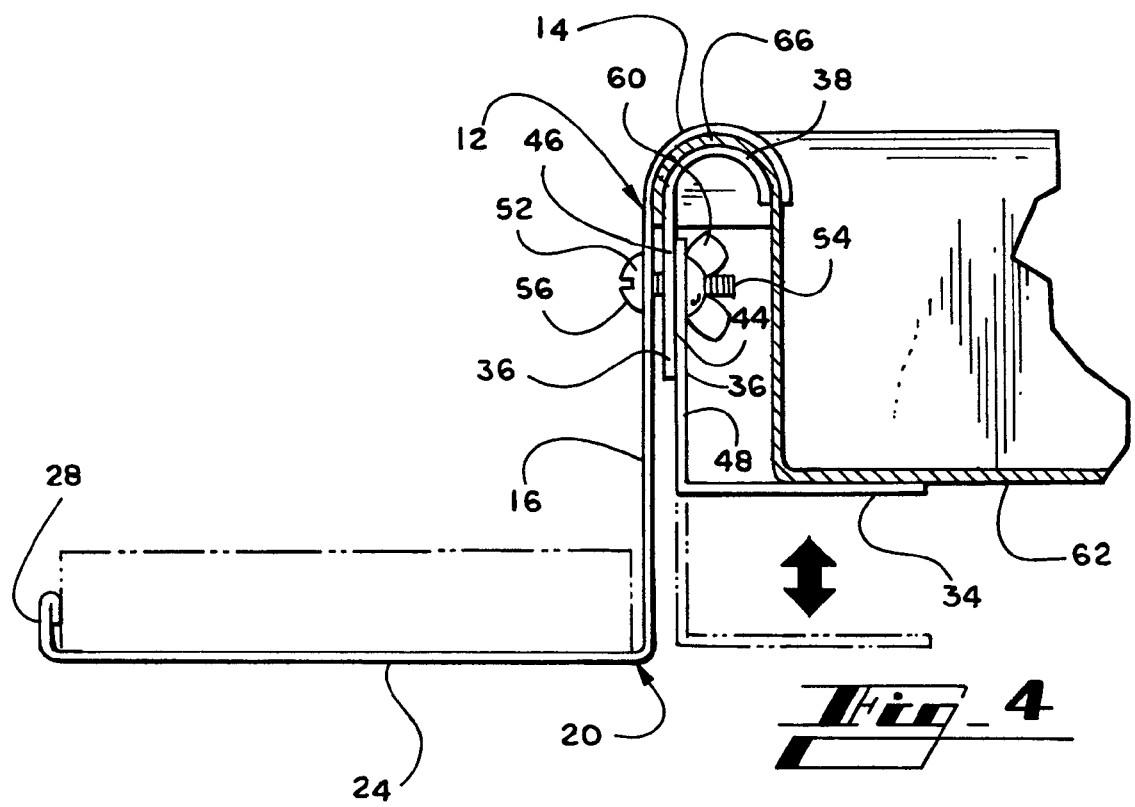

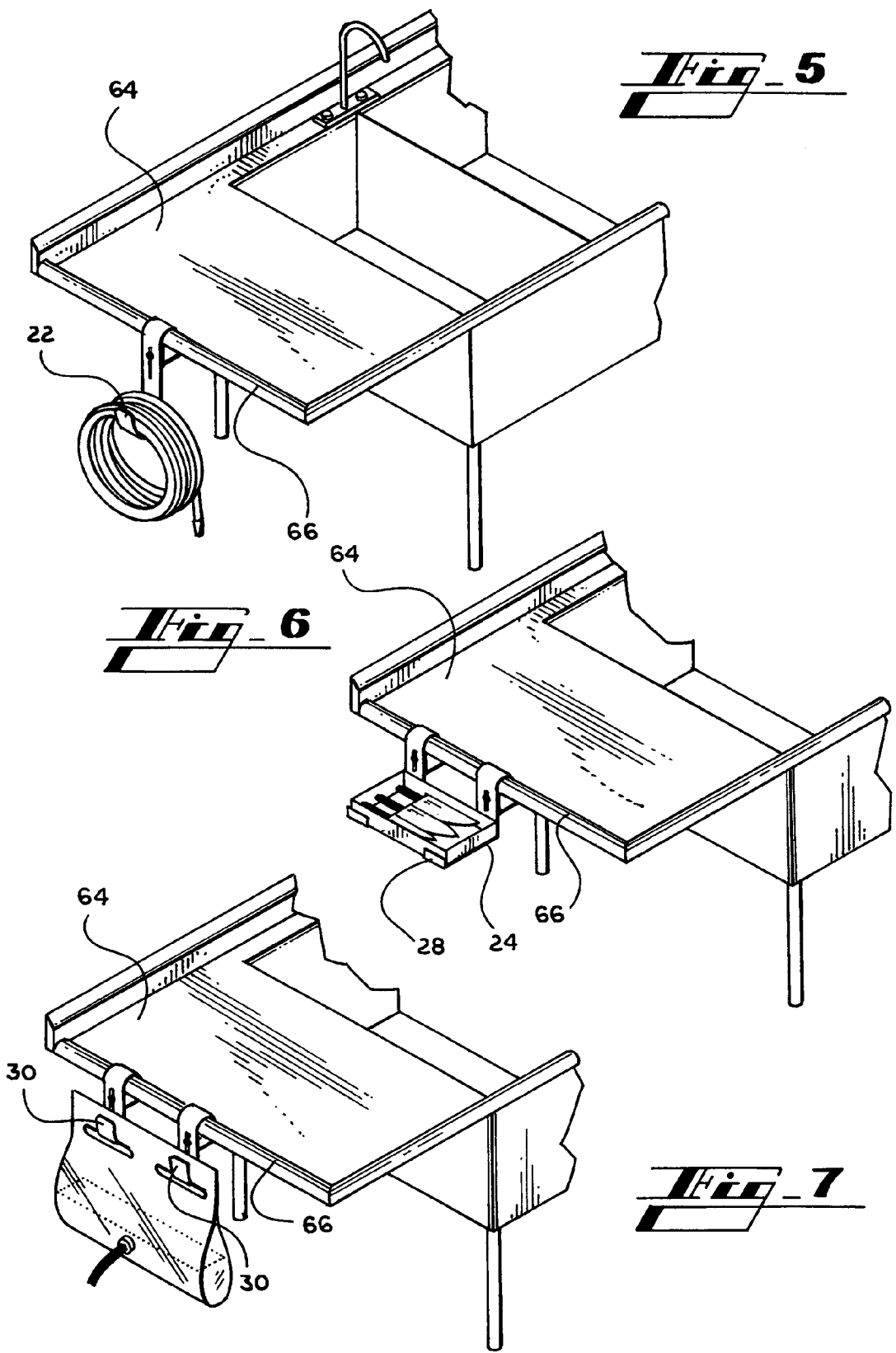

CLAMPING DEVICE FOR STAINLESS STEEL SINKS

FIELD OF THE INVENTION

The present invention relates generally to a clamping device and more specifically a clamping device for stainless steel sinks having a rolled rim edge.

BACKGROUND OF THE INVENTION

Food Service businesses commonly have one or more stainless steel sinks. These sinks are usually freestanding with an open area underneath. They may comprise one or more compartments dependent upon the design the user needs. A 3-compartment sink is the most common of the designs. These sinks commonly have a working surface with a rolled rim edge along the front and sides which minimize midsection discomfort when bending over the working surface to wash, rinse, and sanitize cooking equipment used during food preparation.

All food preparation items must be routinely washed, rinsed, and sanitized after each use. Regulatory agencies require a three-step process of washing, rinsing, and sanitizing all food contact surfaces, followed by an air drying process; thus, illustrating the importance of the compartmentalized sinks. Employees wash the items in one compartment, rinse the items in a second compartment, and sanitize the items in the third compartment. Because the workload at the sink area is intense and very repetitious, there is always a plurality of cooking equipment, detergents, sanitizers, and other items in and around the sink area. Historically, wall-mounted racks have been a means for organizing such items. However, wall-mounted racks require holes that create potential portals of entry for insects and rodents and aesthetically damage the walls. Since adequate space is a premium in most food preparation areas, particularly around the sink area, a means for organizing cleaning chemicals, cleaning tools, and other ancillary food service equipment would be beneficial to food service establishments.

Employee safety is also a primary concern in food preparation areas. The floors are especially important to safety since greasy floors can cause a slip and fall, and thus results in possible injury and liability issues for the business operators. The floor cleaning process is usually performed with a food grade water hose attached to a hose bib outlet, in conjunction with a mopping arrangement. Quite often, the hose is stored under the silk on the floor, or in some instances, a wall-mounted hose hanger is used, attached to a wall stud with either screws or bolts. Regulatory agencies quite often deduct points for hoses left openly exposed on the floor, as it is a cleaning hindrance and a walking safety hazard.

Chemical manufactures maintain a marketing focus in the food service industry. Numerous manufacturers provide an array of cleaning products, along with employee training tools and chemical dispensing equipment to control the consumption rate of the product. Chemical manufacturers package their chemicals utilizing different concepts. Gallon containers, five-gallon pails, and polypropylene bags are the most common types of packaging used. The chemicals are stored on the floor under the sinks, on the drain board of the sinks, in racks mounted to the walls near the sinks, or in freestanding racks around and under the sinks.

U.S. Pat. No. 6,808,147 to Brannen, et al recognized a need in the food service industry for a versatile device which aid in safely organizing and making readily accessible items used while working at and around the sink area. The device disclosed therein consists of a facial plate having a front and a crispate top connecting the front to a back. The front has a pair of elongated slots disposed substantially near the bottom and extend upward vertically therefrom. Inserted between the front and back is a compression gib. The compression gib has a pair of grooves which align with the slots in the facial plate. A supporting member having two arms and a pair of threaded ends are received by the vertical slots in the front facial plate. Fastening means and washers are affixed to the threaded ends of the supporting member.

A disadvantage of the device disclosed by Brannen, et al exists in that it is cumbersome to handle and require several complex procedures to assemble and install. A further disadvantage that exists in the prior art is the need for an oversized facial plate and gib which increase the overall cost associated with the manufacture of such a device. In addition to the increased cost associated with the manufacture of the prior art device, a further disadvantage exists in that the numerous small components such as the washers, fastening means, and bracing members create a hazard if left lying in the food preparation area.

SUMMARY OF THE INVENTION

It is therefore an object of the present invention to provide a clamping device for stainless steel sinks which aids in safely organizing and making readily accessible items used while working at and around the sink area.

It is another object of the present invention to provide a clamping device for stainless steel sinks wherein assembly and installation are performed by the mere expedient of tightening a single bolt.

It is another object of the present invention to provide a clamping device for stainless steel sinks which may be fabricated easily and inexpensively.

It is a further object of the present invention to provide a clamping device for stainless steel sinks which can accommodate sinks having various drain broad depths.

An even further object of the present invention is to provide a clamping device for stainless steel sinks which, when installed, can be slid along the edge of the rolled rim working surface at a subsequent time by the mere expedient of loosening a single bolt.

The present invention provides a clamping device for stainless steel sinks having rolled rim edges. The device comprises a hanger bracket having a crispate top and a front connecting the crispate top to a supporting member. The front has an elongated vertical slot which extends the length along a longitudinal axis. Inserted within the crispate top of the hanger bracket, in planar relation therewith, is a compression gib. It should be appreciated that the unique compression gib design of the present invention provides a clamping force equal to that of the bulkier more costly compression gib of the prior art. The compression gib includes a generally horizontally disposed bracing arm and further having an integral arm which extends upwardly and vertically in relation to the bracing arm. The integral arm further has an elongated vertical slot which extends the length along a longitudinal axis. Attached to the upper most portion of the integral arm is a crispate top which is substantially identical in configuration and shape to the arcuate portion of the underside of the rolled rim sink to which it is attached. A fastening means is received by the slots of the hanger bracket and compression gib and detachably holds the device together.

Other aspects, objects, features, and advantages of the present invention will become apparent to those skilled in the art upon reading the detail description of preferred embodiments in conjunction with the accompanying and appended claims.

DESCRIPTION OF THE DRAWINGS

In the drawings, which are discussed below, the same reference numerals refer to the same features of the invention throughout the drawings. A clamping device for stainless sinks, according to the preferred embodiment of the invention is, shown in FIGS. 1-7.

FIG. 3 represents a side view of the clamping device of FIG. 1 having a hook shaped supporting member.

FIG. 4 represents a side view of the clamping device of FIG. 2 having a shelf supporting member.

FIG. 5 represents a perspective view of the clamping device, in accordance with the principles of the present invention, having a U-shaped supporting member accommodating a hose in combination with a rolled rim stainless steel sink.

FIG. 6 represents a perspective view of the clamping device, in accordance with the principles of the present invention, having a shelf supporting member embracing a storage bin in combination with a rolled rim stainless steel sink.

FIG. 7 represents a perspective view of the clamping device, in accordance with the principles of the present invention, having hook shaped supporting members suspending an industrial chemical bag in combination with a rolled rim stainless steel sink.

DETAILED DESCRIPTION OF THE INVENTION

While the specification concludes with claims particularly pointing out and distinctly claiming the subject matter which is regarded as the invention, the invention will now be described by reference to the following description of preferred embodiment taken in conjunction with the accompanying drawings.

Figure 1:
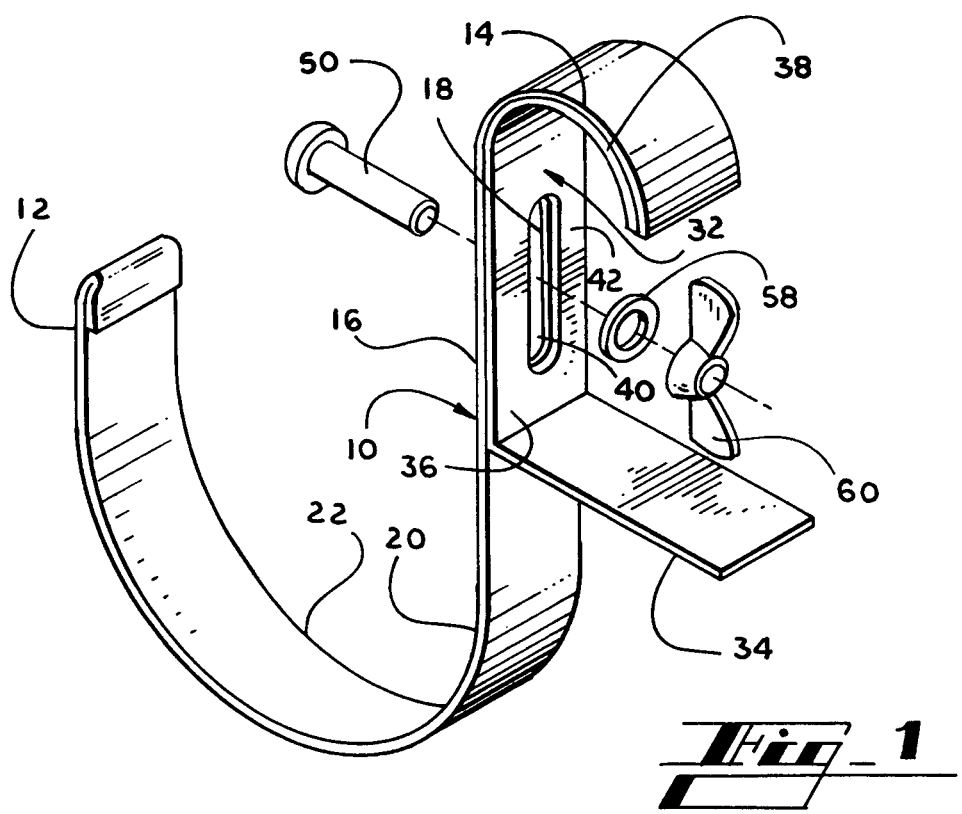
FIG. 1 represents an isometric view of the clamping device for stainless steel sinks, assembled in accordance with the principles of the present invention, showing the single piece compression gib.
Figure 2:
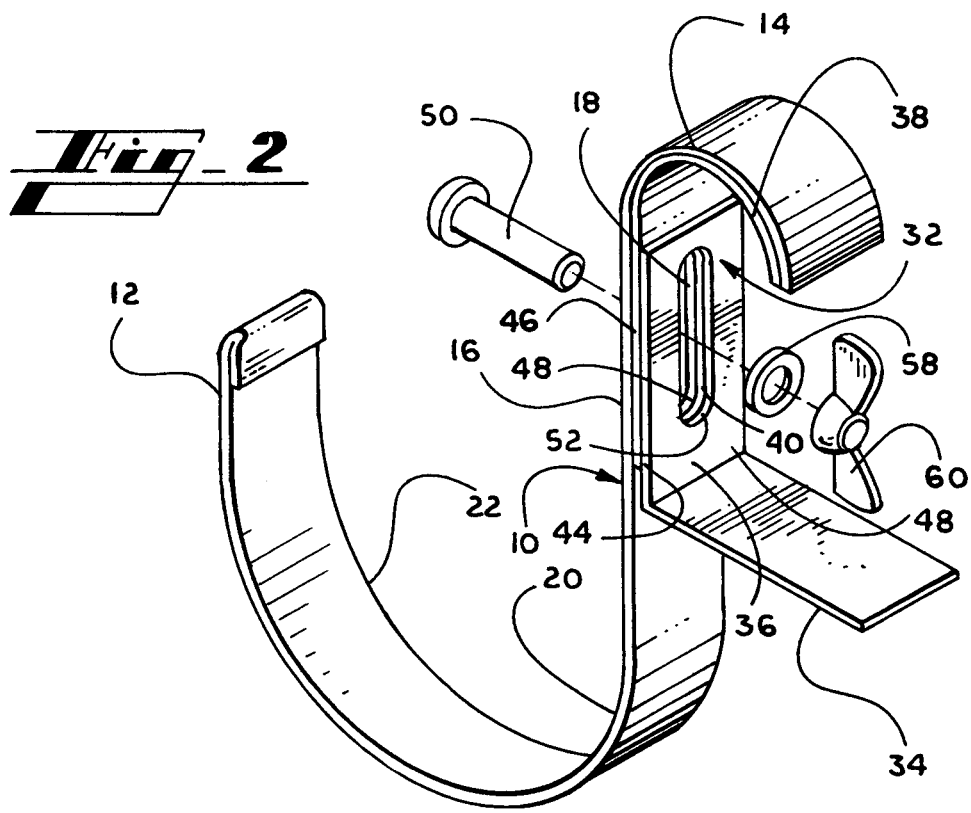
FIG. 2 represents an isometric view of the clamping device for stainless steel sinks, assembled in accordance with the principles of the present invention, showing the adjustable two piece compression gib.

Referring now to the drawings, and particularly FIGS. 1 and 2, there is shown an isometric view of a clamping device for stainless steel sinks generally designated by the reference 10 constructed according to the principles of the present invention. The present device, in its broadest context, has as its components a hanger bracket 12, a compression gib 32, and fastening means 50. The hanger bracket 12 is further defined by a front 16, a supporting member 20, and a crispate top 14. Additionally, the front 16 has an elongated vertical slot 18 which extends the length of the front 16 along a longitudinal center axis. The supporting member 20 is attached to the lower portion of the hanger bracket 12, when the device 10 is in operation, and may embrace one of several different embodiments.

In one embodiment, the supporting member 20 forms a U-shape 22 as depicted in FIGS. 2 and 5, of sufficient size to accommodate a hose. In an alternative embodiment the support member 20 forms a shelf 24, as seen in FIG. 4, which extends radially outward from the front 16 substantial distance and perpendicularly thereto. The terminal end 28 of the shelf supporting member 24, further has an upward perpendicular bend which allows the shelf to embrace a storage bin, as best illustrated in FIG. 6. In a further embodiment the supporting member has a hook shape 30, as shown in FIG. 3. The hook shape supporting member 30 has a diameter substantially less then the U-shape supporting member 22 and is used as a suspension means for holding industrial chemical bags or the like. In practice, the design of the chemical bag being held by the clamping device 10 will dictate whether more than one hook shape supporting member 30 will be necessary as shown in FIG. 7. It is to be appreciated, however, that other supporting member configurations are also possible.

Completing the hanger bracket 12 and proximal to the top of the front 16 is a crispate top 14. The crispate top 14 is disposed outwardly in opposition to the supporting member 20 and is molded to encapsulate the entire outer portion of the sinks rolled rim 66. It is contemplated that the crispate top 14 of the hanger bracket 12 is designed to be modified in shape and size to accommodate a variety of rolled rim designs.

The most distinguishing feature of the present clamping device 10 is the compression gib 32 which for the reasons stated previously is superior to that of the prior art. The compression gib 32, when is use, includes a generally horizontally disposed bracing arm 34 and further having an integral arm 36 which extends upwardly and vertically in relation to the bracing arm 34. Attached to the upper most portion of the integral arm 36 is a crispate top 38 which is disposed inwardly toward the integral arm 36 which is substantially identical in configuration and shape to the arcuate portion of the underside of the rolled rim 66 as seen in FIGS. 3 and 4. The integral arm 36 of the compression gib 32, also has an elongated vertical slot 40 which extends the length of the integral arm 36 along a longitudinal center axis. The crispate top of the gib 38 is adapted to engage the underside of the rolled rim when in operation. Like the crispate top of the hanger bracket 14, the gib crispate top 38 is designed to be modified in shape and size to accommodate a variety of rolled rim designs. The bracing arm 34, is adapted to engage the underside of the sink's drain board 62. The compression gib 32 is further defined by having a width substantially equal to that of the hanger bracket 12 to which it is later attached. While the preceding compression gib 32 embodiment discloses a single piece configuration 42 which is bent from a single ribbon of steel, the invention is not so limited.

It is contemplated as an alternative embodiment that an adjustable two piece gib 44 can be formed. This advantageously permits the clamping device 10 to accommodate various drain board depths depending upon the sink manufactures specifications. There is shown in FIGS. 2 and 4 an adjustable two piece gib 44 having an inverted J-shaped upper member 46. The extended portion of the inverted J-shaped member 46 has an elongated vertical slot 40 along a longitudinal center axis. In addition a lower L-shaped member 48 has an integral arm 36 with an elongated slot 40 as previously described or a hole and a bracing member 34 which embraces the underside of the drain broad 62. Here to, the two piece compression gib 44 is further defined by having a width substantially equal to that of the hanger bracket 12 to which it is later attached.

During the assembly and installation of the present device the benefits over the prior art device can be appreciated.

To assemble the clamping device 10 the elongated slot of the hanger bracket front 18 and the elongated slot of the compression gib 40 are brought into longitudinal alignment by disposing the hanger bracket 12 in front of the compression gib 32 in planar relation thereto, as best illustrated in FIGS. 1-4. The slots are designed to have a minimum diameter marginally greater than the outermost diameter of the fastening means 50. The fastening means 50 detachably holds the device together. It should be appreciated that either compression gib embodiment can be matched with either hanger bracket. FIGS. 3 and 4 show the fastening means 50 as a bolt 52 of stock construction having an elongated externally threaded portion 54, and a larger diameter bolt head 56. The diameter of the threaded portion 54 of the bolt 52 is related to first engage the elongated slot of the hanger bracket front 18 then the slot of the compression gib 40. When employing the adjustable two piece compression gib 44 the bolt passes first through the slot 40 in the inverted J-shaped 46 upper portion and then the slot 40 in the L-shaped 48 portion. Once the bolt 52 is inserted into the elongated slots of the front hanger bracket 18 and the compression gib 40, the threaded terminal end of the bolt 54 receives a compression washer 58 and wing nut 60. The fastening means 50 is substantially tightened until the hanger bracket 12 rest loosely against the compression gid 32. Thus, a detachable assembly is readily provided for installation. It is to be appreciated that though a bolt is preferred, any suitable fastening means which achieves the desired purpose can be substituted.

To install the now assembled clamping device to the rolled rim sink 64 the crispate top 14 of the hanger bracket 12 is cradled over the rolled rim of the sink 66. In the use of the present device, the compression gib 32 is slid upward in the direction of the arrow as illustrated in FIG. 4 so that the rolled rim of the sink 66 is interposed between the crispate top of the hanger bracket 14 and the crispate top of the compression gib 38 while the bracing arm 34 of the compression gib 32 ultimately engages the underside of the drain broad 62. As illustrated by FIGS. 3 and 4 the compression gib 32 is curved in inverse relation to the rolled rim 66 which provides a clamping force upon the rolled rim of the sink 66. The bolt 52 is then securely tightened clockwise against the backside of the compression gib 32 to lock the clamping device 10 in position. Thus, the engagement of the compression gib 32 with the hanger bracket 12, the underside of the rolled rim 66, and the underside of the drain board 62 prevents the device from being directly slid upward off the rolled rim.

It should be appreciated that the installed device can be repositioned on the rolled rim of the sink 66 by loosening the fastening means 50 thereby releasing the compression gib 32 from the underside of the drain board 62, as depicted by the downward arrow in FIG. 4, and sliding the device 10 horizontally over the rolled rim 66. The installed device 10 is then made operational by sliding the compression gib 32 upward, in the direction of the arrow in FIG. 4, against the underside of the drain board 62 and retightening the fastening means 50.

Preferably the hanger bracket 12 and compression gib 32 are individually molded or shaped, for exemplary purposes only, from a single flattened ribbon of stainless steel, of sufficient width and thickness. Steel is preferred because it provides the perfect medium for sterilization. However, any other suitable material sufficiently rigid so as not to deform under clamping pressure can be utilized.

As should be apparent from the foregoing specification, the invention is susceptible to being modified with various alterations, which may differ from those which have been described in the preceding specification and description. Accordingly, the following claims are intended to cover all alterations and modifications, which do not depart from the spirit of the invention.

What is claimed is:

1. A clamping device for stainless steel sinks comprising:
   i a hanger bracket having a crispate top and a front having a slot and connecting the crispate top to a supporting member;
   ii a compression gib inserted within the crispate top of the hanger bracket in planar relation thereto and having a slot which aligns with said slot of the hanger bracket and further having a bracing arm; and
   iii a fastening means received by said slot of the hanger and said slot of the compression gib.

2. The clamping device for stainless steel sinks of claim 1, whereby the front of the hanger bracket has an elongated vertical slot which extends a length along a longitudinal center axis.

3. The clamping device for stainless steel sinks of claim 1, whereby the supporting member of the hanger bracket has a U-shape.

4. The clamping device for stainless steel sinks of claim 1, whereby the supporting member of the hanger bracket extends radially outward from the front substantial distance and perpendicularly thereto and further having an upward perpendicular bend on a terminal end.

5. The clamping device for stainless steel sinks of claim 1, whereby the supporting member of the hanger bracket has a hook shape.

6. The clamping device for stainless steel sinks of claim 1, whereby the compression gib has a crispate top.

7. The clamping device for stainless steel sinks of claim 1, whereby the compression gib has an elongated vertical slot which extends a length along longitudinal center axis.

8. The clamping device for stainless steel sinks of claim 1, whereby the compression gib has an inverted J-shaped upper member and a lower L-shaped member.

9. The clamping device for stainless steel sinks of claim 8, whereby the compression gib has an elongated vertical slot on an extended portion of the J-shaped upper member.

10. The clamping device for stainless steel sinks of claim 8, whereby the compression gib has an integral arm with an elongated vertical slot and a bracing member on the L-shaped lower member.

11. The clamping device for stainless steel sinks of claim 1, whereby the compression gib has a width substantially equal to that of the hanger bracket.

12. The clamping device for stainless steel sinks of claim 1, whereby the fastening means is an elongated externally threaded bolt.

13. The clamping device for stainless steel sinks of claim 1, whereby said device is
   assembled by bringing into longitudinal alignment the elongated slot of the hanger bracket and the elongated slot of the compression gib by disposing the hanger bracket in front of the compression gib in planar relation thereto, while the fastening means is related to first engage the elongated slot of the hanger then the elongated slot of the compression gib thereby detachably holding the device together.

14. The clamping device for stainless steel sinks of claim 13, whereby the assembled device is installed onto said sink by cradling the crispate top of the hanger bracket over the rolled rim of the sink while the compression gib engages the underside of the drain board when slid upward so that the rolled rim of the sink becomes interposed between the crispate top of the hanger bracket and the compression gib.

15. The clamping device for stainless steel sinks of claim 14, whereby said assembled device is repositioned by loosing said fastening means and sliding said device horizontally over said rolled rim of said sink and made operational by retightening said fastening means.

* * * * *